(12) United States Patent
Chin

(10) Patent No.: US 11,515,817 B2
(45) Date of Patent: Nov. 29, 2022

(54) VOICE COIL MOTOR DRIVING DEVICE AND METHOD FOR PROVIDING CONTROL SIGNAL OF THE SAME

(71) Applicant: SILICON TOUCH TECHNOLOGY INC., Hsinchu (TW)

(72) Inventor: Chi-Yuan Chin, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 389 days.

(21) Appl. No.: 16/937,906

(22) Filed: Jul. 24, 2020

(65) Prior Publication Data

US 2021/0184606 A1 Jun. 17, 2021

(30) Foreign Application Priority Data

Dec. 13, 2019 (TW) .................................. 108145631

(51) Int. Cl.
| H04R 9/02 | (2006.01) |
| H02P 25/034 | (2016.01) |
| H02K 41/035 | (2006.01) |
| H02P 7/025 | (2016.01) |

(52) U.S. Cl.
CPC ............ *H02P 7/025* (2016.02); *H02P 25/034* (2016.02); *H04R 9/025* (2013.01); *H02K 41/0354* (2013.01)

(58) Field of Classification Search
CPC .... H02K 41/0354; H04R 9/025; H02P 25/034
USPC ...................................................... 310/12.16
See application file for complete search history.

(56) References Cited

U.S. PATENT DOCUMENTS

| 5,084,661 A | 1/1992 | Tanaka |
| 7,382,570 B1 | 6/2008 | Li et al. |
| 2007/0253099 A1 | 11/2007 | Derosa et al. |
| 2008/0265825 A1 | 10/2008 | Su |
| 2016/0050497 A1* | 2/2016 | Daubigny ................ H04R 3/02 |
| | | 381/120 |
| 2019/0058423 A1 | 2/2019 | Knoedgen et al. |

FOREIGN PATENT DOCUMENTS

| CN | 104349262 A | * | 2/2015 | .......... H04R 29/001 |
| CN | 106717022 A | * | 5/2017 | ............. G01K 13/00 |
| EP | 3120576 B1 | | 9/2018 | |
| TW | 200843303 A | | 11/2008 | |
| TW | 201707521 A | | 2/2017 | |
| TW | I595739 B | | 8/2017 | |

* cited by examiner

*Primary Examiner* — Jose A Gonzalez Quinones
(74) *Attorney, Agent, or Firm* — Li & Cai Intellectual Property (USA) Office

(57) ABSTRACT

A voice coil motor driving device and a method for providing control signals of the same are provided. The voice coil motor driving device includes a control module, a current driving module, and an input module. The current driving module outputs a plurality of digital current signals according to a driving signal, each of the plurality of digital current signals includes a plurality of current unit signals, and each of the plurality of digital current signals is arranged in a first time period, each of the plurality of digital current signals includes a plurality of reverse current unit signals, and the plurality of reverse current unit signals are arranged in a second time period, which is at a beginning of the first time period, or arranged in a third time period, which is at the end of the first time period.

10 Claims, 4 Drawing Sheets

VOICE COIL MOTOR DRIVING DEVICE AND METHOD FOR PROVIDING CONTROL SIGNAL OF THE SAME

CROSS-REFERENCE TO RELATED PATENT APPLICATION

This application claims the benefit of priority to Taiwan Patent Application No. 108145631, filed on Dec. 13, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a voice coil motor driving device and a method for providing control signals of the same, and more particularly to a voice coil motor driving device that reduces a hysteresis effect and a method for providing control signals of the same.

BACKGROUND OF THE DISCLOSURE

A voice coil motor is a device that converts electrical energy into mechanical energy, which generates a regular motion of the voice coil motor, by utilizing a magnetic field interaction that is generated from a permanent magnet and an electrically conducted coil. However, a hysteresis effect of the coil significantly reduces the efficiency of the voice coil motor.

Therefore, development toward reducing the hysteresis effect of the voice coil motor driving devices has become an important issue for the industry.

SUMMARY OF THE DISCLOSURE

In response to the above-referenced technical inadequacies, the present disclosure provides a voice coil motor driving device.

In one aspect, the present disclosure provides a voice coil motor driving device that receives initial data, and outputs a plurality of control signals to a voice coil motor. The voice coil motor driving device includes a control module, a current driving module, and an input module. The current driving module is electrically connected to the control module. The input module receives the initial data and transmits the initial data to the control module. The control module generates a driving signal according to the initial data, the control module transmits the driving signal to the current driving module, the current driving module outputs a plurality of digital current signals according to the driving signal, and each of the plurality of digital current signals includes a plurality of current unit signals. Each of the plurality of digital current signals is arranged in a first time period, each of the plurality of digital current signals includes a plurality of reverse current unit signals, and the plurality of reverse current unit signals are arranged in a second time period, which is at a beginning of the first time period, or arranged in a third time period, which is at the end of the first time period.

In another aspect, the present disclosure provides a method for providing control signals of a voice coil motor, which converts electrical energy into mechanical energy, including the following steps: providing a plurality of forward current unit signals according to a displacement; providing a plurality of reverse current unit signals according to the plurality of forward current unit signals; and chronologically arranging the plurality of reverse current unit signals after the plurality of forward current unit signals, chronologically arranging the plurality of reverse current unit signals before the plurality of forward current unit signals, or chronologically arranging the plurality of reverse current unit signals both before and after the plurality of forward current unit signals.

One of the advantages of the present disclosure is that both the voice coil motor driving device and the method for providing the control signals of the voice coil motor driving device can effectively regulate the stroke and the power required for the voice coil motor, and therefore, the hysteresis effect caused by the forward current unit signals and the reverse current unit signals is further considered, such that the forward current unit signals and the reverse current unit signals with currents having opposite directions are provided to reduce a hysteresis effect, which significantly increases the efficiency of the voice coil motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
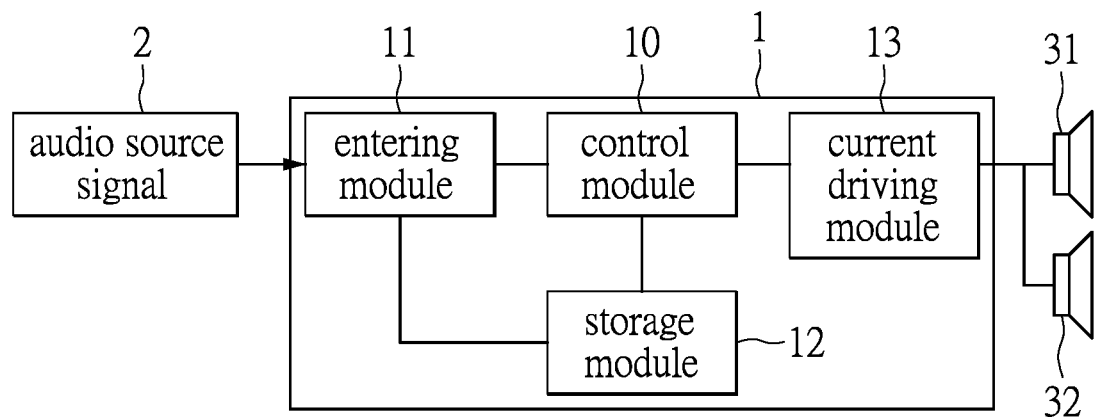
FIG. 1 is a block diagram of a voice coil motor driving device providing a driving signal to a speaker in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
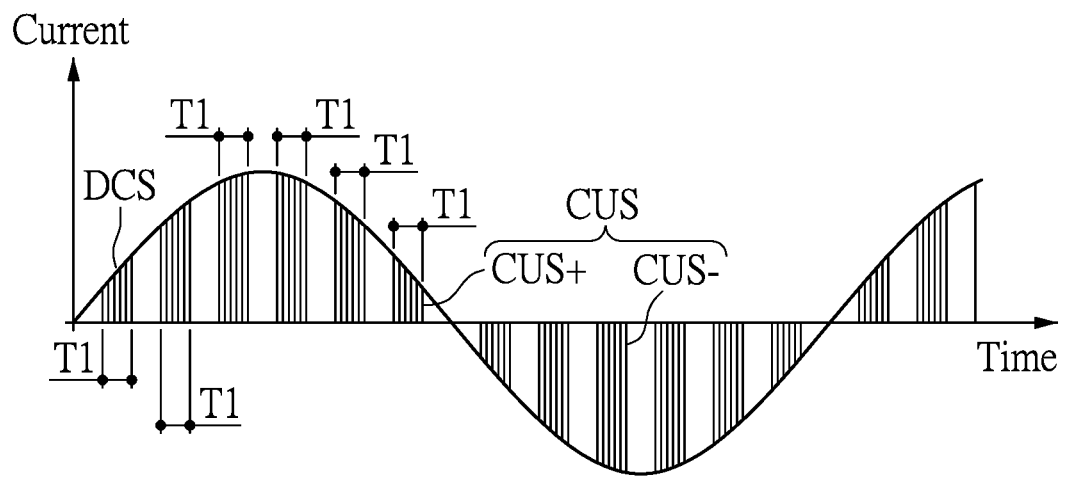
FIG. 2 is a schematic view of a plurality of digital current signals provided by the voice coil motor driving device in the first embodiment of the present disclosure.

Reference is made to FIG. 1, which is a block diagram of a voice coil motor driving device providing a driving signal to a speaker in a first embodiment of the present disclosure. Reference is made to FIG. 2, which is a schematic view of a plurality of digital current signals provided by the voice coil motor driving device in the first embodiment of the present disclosure.

A voice coil motor driving device 1 receives initial data, so as to output a plurality of control signals to a voice coil motor. In this embodiment, the initial data is an audio source signal 2, and the voice coil motor is disposed in the speaker.

The voice coil motor driving device 1 includes a control module 10, an inputting module 11, a storage module 12, and a current driving module 13.

The inputting module 11, the storage module 12, and the current driving module 13 are electrically connected to the control module 10. The inputting module 11 is electrically connected to the storage module 12.

The inputting module 11 receives initial data, and transmits the initial data to the control module 10. The inputting module 11, which is composed of a filter circuit, a register circuit, or a phase-locked circuit, analyzes the audio source signal 2 preliminarily. The storage module 12 can be a flash memory and a random-access memory, and the present disclosure is not limited thereto.

The data analyzed preliminarily by the inputting module 11 can be provided directly to the control module 10, or be stored in the storage module 12, so as to be provided for the control module 10 to use.

The control module 10 generates a driving signal according to the initial data. The control module 10 can provide the driving signal to the current driving module 13 according to the data analysis of the inputting module 11. The current driving module 13 can thus provide a plurality of corresponding digital current signals DCS, to a first voice coil motor 31 and a second voice coil motor 32.

Referring to FIG. 2, the plurality of digital current signals DCS is a sinusoidal and cosinusoidal wave. Each of the plurality of digital current signals DCS includes a plurality of current unit signals CUS. The plurality of digital current signals DCS, as shown in FIG. 2, are current signals in a first time period T1, where the first time period T1 is retrieved as a cycle. That is to say, the first time period T1 can be regarded as a control basis of a basic signal period. In this embodiment, the first time period T1 can be a nanosecond ($10^{-6}$ second) and a picosecond ($10^{-9}$ second), and the present disclosure is not limited thereto. The plurality of current unit signals CUS is arranged in the first time period T1 of the plurality of digital current signals DCS.

In this embodiment, the plurality of digital current signals DCS can include a plurality of forward current unit signals CUS+ and a plurality of reverse current unit signals CUS−. The plurality of forward current unit signals CUS+ provides current unit signals with a positive current value, and the plurality of reverse current unit signals CUS− provides current unit signals with a negative current value. Moreover, amplitudes of the plurality of forward current unit signals CUS+ and the plurality of reverse current unit signals CUS− are changeable. That is to say, the amplitudes of the plurality of forward current unit signals CUS+ and the plurality of reverse current unit signals CUS− can be adjusted according to the driving signal. The amplitudes of the plurality of forward current unit signals CUS+ can be identical or non-identical to one another. In addition, the amplitudes of the plurality of reverse current unit signals CUS− can also be identical or non-identical to one another as well. Furthermore, a plurality of current unit signals CUS can be arranged in the first time period T1. That is to say, the plurality of forward current unit signals CUS+ and the plurality of reverse current unit signals CUS− can be arranged in the first time period T1. Furthermore, the quantity of the plurality of current unit signals CUS (the plurality of forward current unit signals CUS+ and the plurality of reverse current unit signals CUS−) can be adjusted, and is not limited in the present disclosure.

Figure 3:
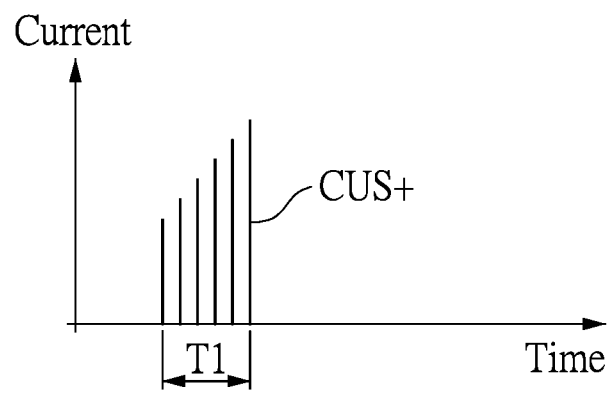
FIG. 3 is a schematic view of a first allocation of the plurality of digital current signals as shown in FIG. 2.
Figure 4:
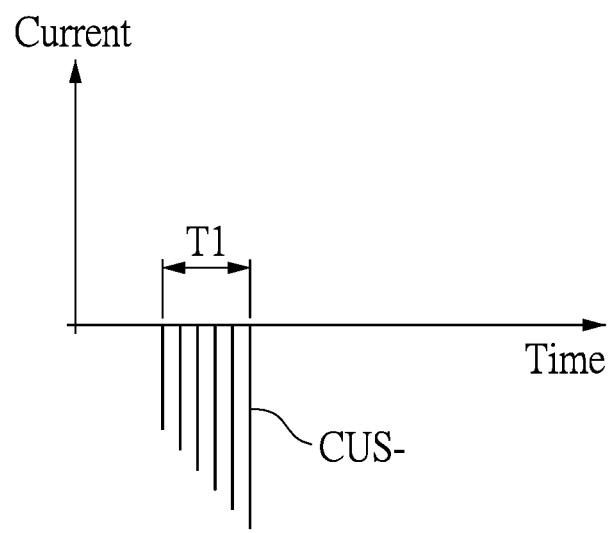
FIG. 4 is a schematic view of a second allocation of the plurality of digital current signals as shown in FIG. 2.
Figure 5:
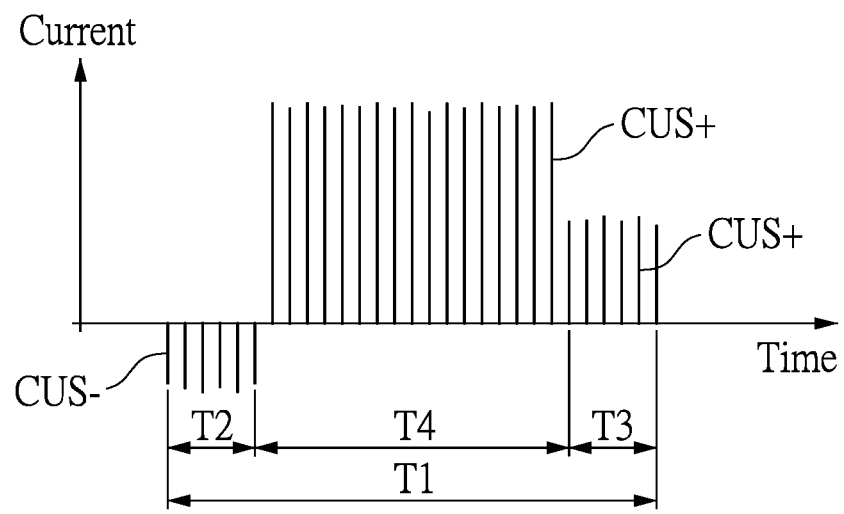
FIG. 5 is a schematic view of a third allocation of the plurality of digital current signals as shown in FIG. 2.
Figure 6:
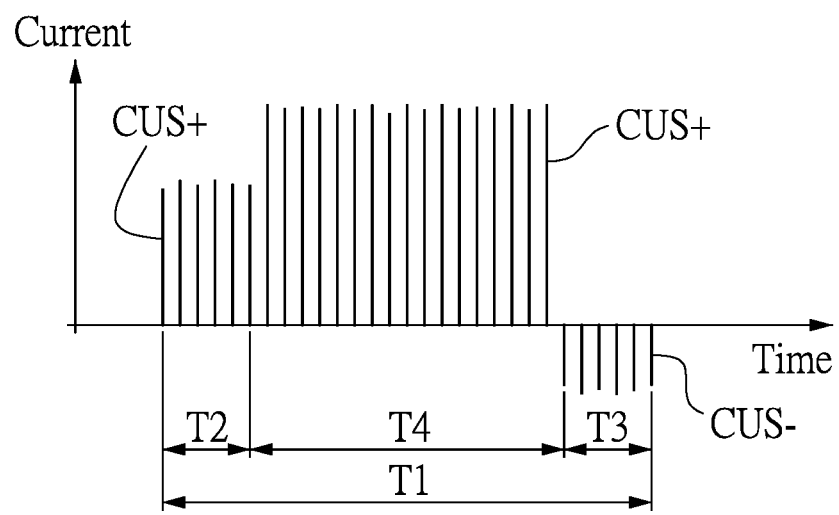
FIG. 6 is a schematic view of a fourth allocation of the plurality of digital current signals as shown in FIG. 2.
Figure 7:
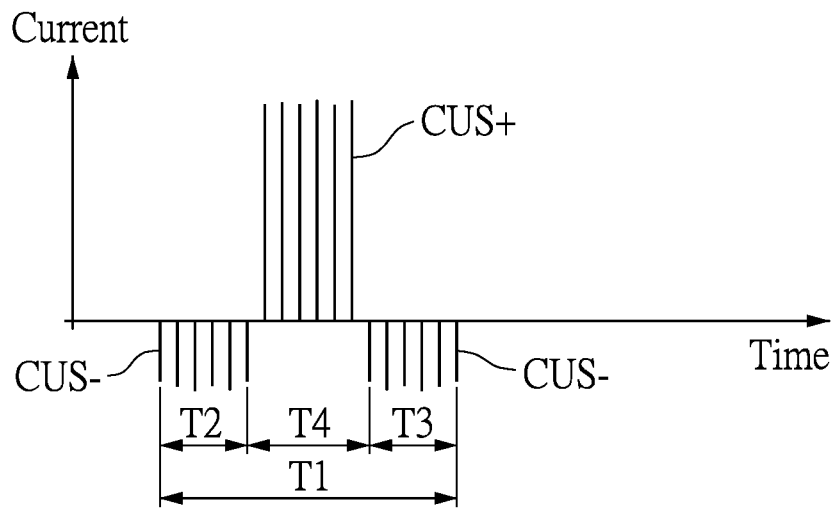
FIG. 7 is a schematic view of a fifth allocation of the plurality of digital current signals as shown in FIG. 2.

Reference is made to FIG. 3, which is a schematic view of a first allocation of the plurality of digital current signals as shown in FIG. 2. Reference is made to FIG. 4, which is a schematic view of a second allocation of the plurality of digital current signals as shown in FIG. 2. Reference is made to FIG. 5, which is a schematic view of a third allocation of the plurality of digital current signals as shown in FIG. 2. Reference is made to FIG. 6, which is a schematic view of a fourth allocation of the plurality of digital current signals as shown in FIG. 2. Reference is made to FIG. 7, which is a schematic view of a fifth allocation of the plurality of digital current signals as shown in FIG. 2.

FIG. 3 to FIG. 7 shows the first allocation, the second allocation, the third allocation, the fourth allocation, and the fifth allocation of the plurality of forward current unit signals CUS+ and the plurality of reverse current unit signals CUS− of the plurality of digital current signals DCS.

Each of the plurality of current unit signals CUS can include the plurality of forward current unit signals CUS+ and the plurality of reverse current unit signals CUS−. On one hand, as shown in FIG. 3, in the first time period T1, all of the plurality of current unit signals CUS are the plurality of forward current unit signals CUS+. On the other hand, as shown in FIG. 4, all of the plurality of current unit signals CUS are the plurality of reverse current unit signals CUS−. However, in a process of driving a voice coil motor, although being driven by all of the plurality of forward current unit signals CUS+ that are the same or all of the plurality of reverse current unit signals CUS− that are the same can shorten the amount of time of the forward stroke, the time of the reverse stroke will be subsequently delayed, due to a hysteresis effect of the coil. Therefore, in the third allocation, the fourth allocation, and the fifth allocation, both of the plurality of forward current unit signals CUS+ and the plurality of reverse current unit signals CUS− are arranged in the first time period T1.

As shown in FIG. 5 to FIG. 7, the first time period T1 can further include a second time period T2, a third time period T3, and a fourth time period T4. In a chronological order, the afore-mentioned time periods are sequentially the second time period T2, the fourth time period T4, and the third time period T3.

That is to say, the second time period T2 is a time period at the beginning of the first time period T1, and the third time period T3 is a time period at the end of the first time period T1. In this embodiment, the second time period T2 and the third time period T3 are both shorter than half of the first time period T1.

As shown in FIG. 5, the plurality of reverse current unit signals CUS− are arranged in the second time period T2. The plurality of forward current unit signals CUS+ are arranged in the third time period T3 and the fourth time period T4. The function of the plurality of current unit signals CUS in FIG. 5 is to provide the plurality of reverse current unit signals CUS− at the beginning of the first time period T1, such that the coil is degaussed in advance, so as to reduce the effect of the hysteresis effect. The plurality of forward current unit signals CUS+ of the fourth time period T4 and the third time period T3 are then provided for a power of the predetermined stroke of the first voice coil motor 31 and the second voice coil motor 32.

As shown in FIG. 6, the plurality of reverse current unit signals CUS− are arranged in the third time period T3. The plurality of forward current unit signals CUS+ are arranged in the second time period T2 and the fourth time period T4. The plurality of current unit signals CUS in FIG. 6 provide the plurality of reverse current unit signals CUS− before the first time period T1 ends, such that the coil is degaussed after the stroke of the voice coil motor is completed, so as to reduce the hysteresis effect in the subsequent cycle. The plurality of forward current unit signals CUS+ of the fourth time period T4 and the second time period T2 are then provided for the power of the predetermined stroke of the first voice coil motor 31 and the second voice coil motor 32.

As shown in FIG. 7, the plurality of reverse current unit signals CUS− are arranged in the second time period T2 and the third time period T3. The plurality of forward current unit signals CUS+ are arranged in the fourth time period T4. The plurality of current unit signals CUS in FIG. 7 provide the plurality of reverse current unit signals CUS− at the beginning and before the end of the first time period T1, such that the coil is degaussed both in advance and after the stroke of the voice coil motor is completed, so as to reduce the hysteresis effect. The plurality of forward current unit signals CUS+ of the fourth time period T4 are then provided for the power of the predetermined stroke of the first voice coil motor 31 and the second voice coil motor 32.

In this embodiment, the power required for the voice coil motors are divided, utilizing the current driving module 13 to provide the plurality of forward current unit signals CUS+ and the plurality of reverse current unit signals CUS− as a power that drives the voice coil motor. Moreover, the hysteresis effect caused by the plurality of forward current unit signals CUS+ and the plurality of reverse current unit signals CUS− is further considered, such that the plurality of forward current unit signals CUS+ and the plurality of reverse current unit signals CUS− having opposite directions are provided for the purpose of degaussing.

In other words, the required power for a stroke of the voice coil motor in a first direction can be determined according to the plurality of forward current unit signals CUS+. The required power for a stroke of the voice coil motor in a second direction, which is opposite to the first direction, can be determined according to the plurality of reverse current unit signals CUS−. Moreover, in order to achieve the degaussing effect, as shown in FIG. 5, FIG. 6, and FIG. 7 respectively, the number and the amplitudes of the plurality of reverse current unit signals CUS− are determined according to the number and the amplitudes of the corresponding plurality of forward current unit signals CUS+ in each of the figures respectively. That is to say, as shown in FIG. 5, the number and the amplitudes of the plurality of reverse current unit signals CUS− in the second time period T2 is determined by the number and the amplitudes of the plurality of forward current unit signals CUS+ in the third time period T3 and the fourth time period T4. As shown in FIG. 6, the number and the amplitudes of the plurality of reverse current unit signals CUS− in the third time period T3 is determined by the number and the amplitudes of the plurality of forward current unit signals CUS+ in the second time period T2 and the fourth time period T4. As shown in FIG. 7, the number and the amplitudes of the plurality of reverse current unit signals CUS− in the second time period T2 and the third time period T3 is determined by the number and the amplitudes of the plurality of forward current unit signals CUS+ in the fourth time period T4. In this embodiment, the fourth time period T4 is longer than or equal to the second time period T2 and the third time period T3.

The current driving module 13 in this embodiment is an output-adjustable current output circuit that is composed of a plurality of current pump circuits, thus being able to output the plurality of forward current unit signals CUS+ and the plurality of reverse current unit signals CUS− with different amplitudes.

Second Embodiment

Figure 8:
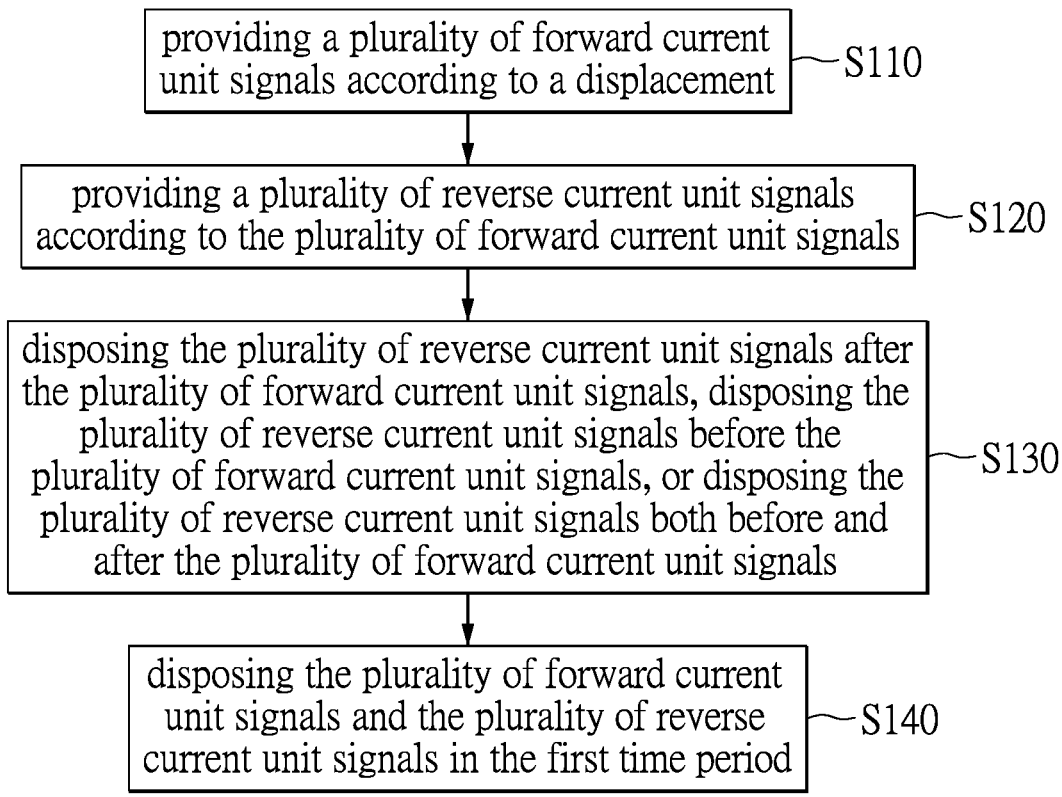
FIG. 8 is a flowchart of a method for providing control signals of a voice coil motor in a second embodiment of the present disclosure.

Referring to FIG. 8, a block diagram of a method for providing control signals of a voice coil motor in a second embodiment of the present disclosure is provided.

In this embodiment, the method for providing the control signals of the voice coil motor includes the following steps:
Step S110: providing a plurality of forward current unit signals according to a displacement;
Step S120: providing a plurality of reverse current unit signals according to the plurality of forward current unit signals; and
Step S130: arranging the plurality of reverse current unit signals after the plurality of forward current unit signals, arranging the plurality of reverse current unit signals before the plurality of forward current unit signals, or arranging the plurality of reverse current unit signals both before and after the plurality of forward current unit signals.
Step S140: arranging the plurality of forward current unit signals and the plurality of reverse current unit signals in a first time period T1.

In step S110, the required stroke of the voice coil motor can be divided into a regulated unit stroke. A power that is required for the regulated unit stroke can then be further calculated. Moreover, the power that is required for the regulated unit stroke of the voice coil motor is required to be further divided, and then the plurality of forward current unit signals CUS+ and the plurality of reverse current unit signals CUS− provided by the current driving module 13 in the first embodiment are utilized as the power that drives the voice coil motor. That is, the plurality of forward current unit signals CUS+ and the plurality of reverse current unit signals CUS− can be one of the power units of the power that is required for the stroke. Since the amplitudes of the plurality of forward current unit signals CUS+ and the plurality of reverse current unit signals CUS− are changeable in this embodiment, the relation between the amplitudes and the strokes can be further determined.

In step S120, the number and the amplitudes of the plurality of reverse current unit signals CUS− that are required are calculated according to the summation of the power of the plurality of forward current unit signals CUS+.

In step S130, an allocation of the plurality of forward current unit signals CUS+ and the plurality of reverse current unit signals CUS− are determined.

As shown in FIG. 5 to FIG. 7, the first time period T1 can further include a second time period T2, a third time period T3, and a fourth time period T4. In a chronological order, the afore-mentioned time periods are sequentially the second time period T2, the fourth time period T4, and the third time period T3.

That is to say, the second time period T2 is at the beginning of the first time period T1, and the third time period T3 is at the end of the first time period T1. In this embodiment, the second time period T2 and the third time period T3 are both shorter than half of the first time period T1.

As shown in FIG. 5, the plurality of reverse current unit signals CUS− are arranged in the second time period T2. The plurality of forward current unit signals CUS+ are arranged in the third time period T3 and the fourth time period T4. The plurality of current unit signals CUS in FIG. 5 provide the plurality of reverse current unit signals CUS− at the beginning of the first time period T1, such that the coil is degaussed in advance, so as to decrease the effect of the hysteresis effect. The plurality of forward current unit signals CUS+ of the fourth time period T4 and the third time period T3 are then provided for a power of the predetermine stroke of a first voice coil motor 31 and a second voice coil motor 32.

As shown in FIG. 6, the plurality of reverse current unit signals CUS− are arranged in the third time period T3. The plurality of forward current unit signals CUS+ are arranged in the second time period T2 and the fourth time period T4. The plurality of current unit signals CUS in FIG. 6 provide the plurality of reverse current unit signals CUS− before the first time period T1 ends, such that the coil is degaussed after the stroke of the voice coil motor is finished, so as to decrease the hysteresis effect of the subsequent cycle. The plurality of forward current unit signals CUS+ of the fourth time period T4 and the second time period T2 are then provided for the power of the predetermine stroke of the first voice coil motor 31 and the second voice coil motor 32.

As shown in FIG. 7, the plurality of reverse current unit signals CUS− are arranged in the second time period T2 and the third time period T3. The plurality of forward current unit signals CUS+ are arranged in the fourth time period T4. The plurality of current unit signals CUS in FIG. 7 provide the plurality of reverse current unit signals CUS− at the beginning and before the end of the first time period T1, such that the coil is degaussed both in advance and after the stroke of the voice coil motor is finished, so as to decrease the hysteresis effect. The plurality of forward current unit signals CUS+ of the fourth time period T4 are then provided for the power of the predetermine stroke of the first voice coil motor 31 and the second voice coil motor 32.

In step S140, the plurality of forward current unit signals CUS+ and the plurality of reverse current unit signals CUS−, which are mentioned above in step S130, are arranged in the first time period T1.

One of the advantages of the present disclosure is that both the voice coil motor driving device and the method for providing the control signals of the voice coil motor driving device can effectively regulate the stroke and the power required for the voice coil motor, and therefore, the hysteresis effect caused by the forward current unit signals and the reverse current unit signals is further considered, such that the forward current unit signals and the reverse current unit signals with currents having opposite directions are provided to reduce the hysteresis effect, which significantly increases the efficiency of the voice coil motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A voice coil motor driving device, receiving initial data, and outputting a plurality of control signals to a voice coil motor, the voice coil motor driving device comprising:
   a control module;
   a current driving module electrically connected to the control module; and
   an input module receiving the initial data and transmitting the initial data to the control module;
   wherein the control module generates a driving signal according to the initial data, the control module transmits the driving signal to the current driving module, the current driving module outputs a plurality of digital current signals according to the driving signal, each of the plurality of digital current signals includes a plurality of current unit signals, and wherein each of the plurality of digital current signals is arranged in a first time period, each of the plurality of digital current signals includes a plurality of reverse current unit signals, and the plurality of reverse current unit signals are arranged in a second time period, which is at a beginning of the first time period, or arranged in a third time period, which is at the end of the first time period.

2. The voice coil motor driving device according to claim 1, wherein amplitudes of the plurality of forward current unit signals and the plurality of reverse current unit signals are the same or different to one another.

3. The voice coil motor driving device according to claim 1, wherein the first time period further includes a fourth time period, and the fourth time period is arranged adjacent to the second time period and the third time period, a time sequence of the second time period, the third time period, and the fourth time period is sequentially the second time period, the fourth time period, and the third time period.

4. The voice coil motor driving device according to claim 3, wherein the plurality of digital current signals further includes a plurality of forward current unit signals, which are at least arranged in the fourth time period.

5. The voice coil motor driving device according to claim 3, wherein the fourth time period is longer than or equal to the second time period, and the fourth time period is longer than or equal to the third time period.

6. The voice coil motor driving device according to claim 1, wherein the plurality of reverse current unit signals are arranged in a third time period at the end of the first time period.

7. The voice coil motor driving device according to claim 1, wherein the second time period and the third time period are both shorter than half of the first time period.

8. The voice coil motor driving device according to claim 3, wherein the plurality of reverse current unit signals, which are arranged in the second time period or the third time period, are determined according to the plurality of forward current unit signals.

9. A method for providing control signals of a voice coil motor, comprising the following steps:
   providing a plurality of forward current unit signals according to a displacement;
   providing a plurality of reverse current unit signals according to the plurality of forward current unit signals; and
   arranging the plurality of reverse current unit signals after the plurality of forward current unit signals, arranging the plurality of reverse current unit signals before the plurality of forward current unit signals, or arranging the plurality of reverse current unit signals both before and after the plurality of forward current unit signals.

10. The method for providing control signals according to claim 9, further comprising the following step:
   arranging the plurality of forward current unit signals and the plurality of reverse current unit signals in the first time period.

* * * * *